United States Patent [19]

Levrai

[11] Patent Number: 5,028,094
[45] Date of Patent: Jul. 2, 1991

[54] BRAKE REGULATOR

[75] Inventor: Roland Levrai, Stains, France

[73] Assignee: Bendix Europe Services Techniques, Drancy, France

[21] Appl. No.: 509,114

[22] Filed: Apr. 16, 1990

[30] Foreign Application Priority Data

Apr. 28, 1989 [FR] France .................. 89 05659

[51] Int. Cl.$^5$ ............................................. B60T 8/30
[52] U.S. Cl. ................................ 303/22.5; 188/195; 303/9.69
[58] Field of Search ............ 303/9.69, 22.5, 22.8, 303/22.7, 22.6, 22.1, 9.75, 9.62, 9.72; 188/195, 349

[56] References Cited

U.S. PATENT DOCUMENTS

| | | | |
|---|---|---|---|
| 3,329,471 | 7/1967 | Oberthur | 303/9.69 |
| 3,503,657 | 3/1970 | MacDuff | 303/9.69 |
| 4,615,566 | 10/1986 | Perrin | 303/6 C |
| 4,629,257 | 12/1986 | Carre et al. | 303/22 A |
| 4,773,712 | 9/1988 | Maggioni et al. | 303/22.5 |
| 4,858,999 | 8/1989 | Schonlau et al. | 188/195 X |
| 4,925,251 | 5/1990 | Picot et al. | 303/22.5 X |

FOREIGN PATENT DOCUMENTS

| | | |
|---|---|---|
| 156666 | 2/1985 | European Pat. Off. |
| 223641 | 2/1987 | European Pat. Off. |
| 2018538 | 10/1970 | Fed. Rep. of Germany . |
| 2564401 | 11/1985 | France . |
| 59-18055 | 5/1985 | Japan . |
| 2184803 | 7/1987 | United Kingdom . |
| 2192146 | 1/1988 | United Kingdom . |

Primary Examiner—Douglas C. Butler
Attorney, Agent, or Firm—Larry J. Palguta; Ken C. Decker

[57] ABSTRACT

The brake regulator controlled by the load of a vehicle uses a fluidic mechanism which acts on a first piston (7) capable of translatory movement in a bore formed in the body (1) of the regulator, the first piston (7) being provided with a push rod (33) capable of cooperating with one end of a second piston (21) forming part of a valve which is open in the rest position. Mechanisms (31,37) are provided for maintaining, at rest, a given distance between the end of the second piston (21) and the push rod (33), the given distance being such that the end of the second piston (21) and the push rod (33) do not come into contact until just before the closure of the valve. Preferably, the push rod (33) is, at rest, in axial abutment against a stationary part (31) of the body (1), the second piston (21) being returned to rest by a spring (41).

4 Claims, 1 Drawing Sheet

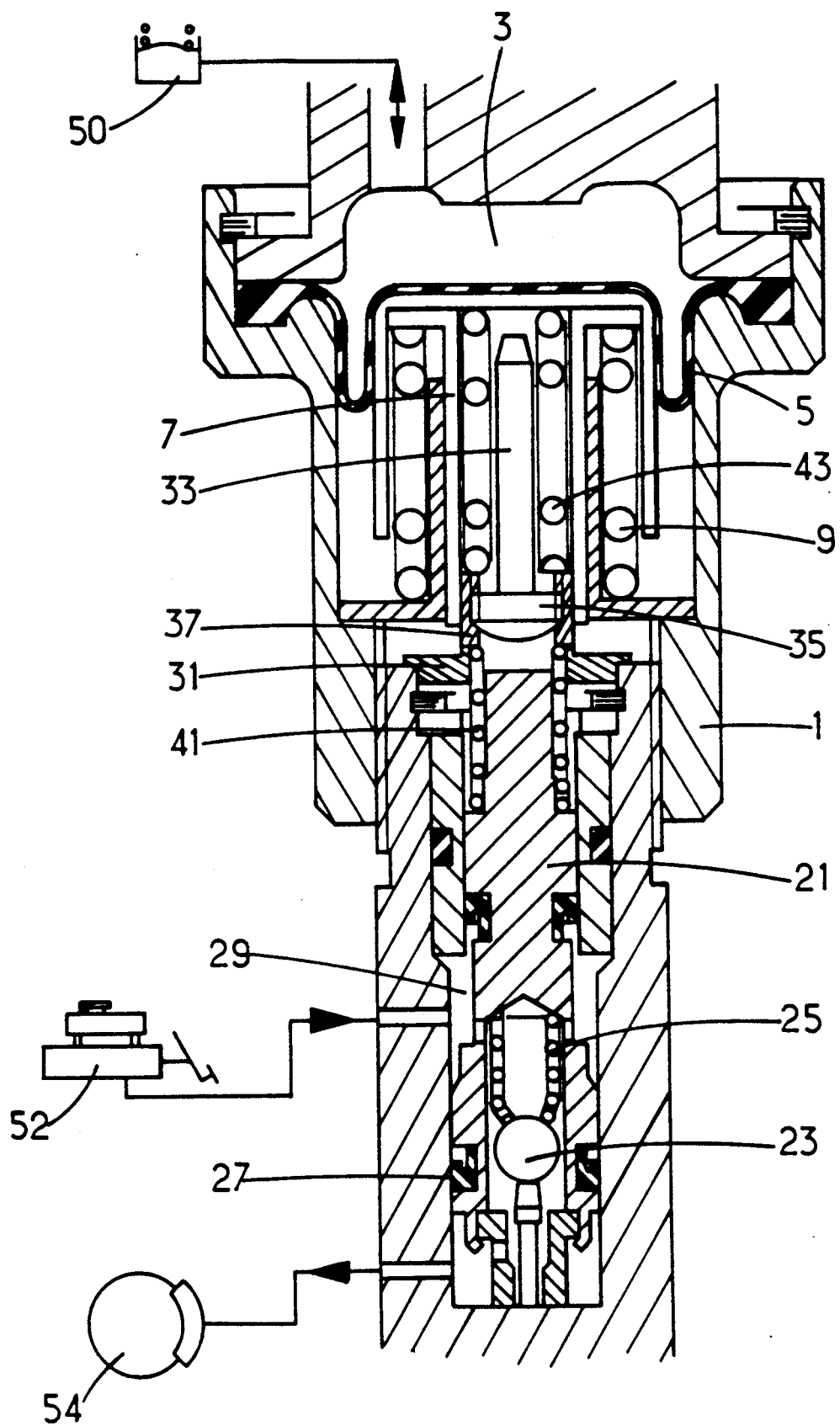

BRAKE REGULATOR

BACKGROUND OF THE INVENTION

The present invention related to brake regulators for motor vehicles which make it possible to reduce the pressure of the brake fluid in the brake circuit of the rear wheels with respect to that of the brake fluid in the brake circuit of the front wheels as a function of the vehicle load.

The invention relates more particularly to a load-controlled regulator of this type using a fluidic means connected, for example, to a hydrostatic cushion arranged close to the vehicle suspension system.

Brake regulators of this type are well known in the art. Conventionally, they comprise a first piston capable of translatory movement in a bore formed in the body of the regulator, under the effect of the fluidic means. This first piston is provided with a push rod which cooperates with the end of a second piston forming part of a valve, for example a ball valve, which is open in the rest position and controls the passage of the brake fluid between a work chamber of the master cylinder and the brake circuit of the vehicle's rear wheels.

Upon application of pressure to the brake fluid, at first, with the valve being open, the pressure is communicated entirely to the brake circuit. Then, when the pressure reaches a given value, the piston closes the valve by being slightly displaced. If the pressure in the master cylinder continues to rise, the valve opens and closes so as to increase proportionally the pressure in the brake circuit. When the regulator is controlled by the load, the push rod exerts on the second piston a force opposite to that exerted by the brake fluid and thus delays the closure of the valve as a function of the vehicle load.

Regulators of this type operate in a perfectly satisfactory manner. However, the pressure increase in the master cylinder causing the second piston, and, consequently, the push rod and the first piston, to move back counter to the fluid cushion results in a considerable increase in the value of the brake fluid pressure at which the valve normally closes, since everything happens as if the vehicle were under a greater load than it actually is, which is detrimental to safety as the rear wheels may then lock before the valve acts.

SUMMARY OF THE INVENTION

The object of the invention is to eliminate these disadvantages by means of a device which is simple and inexpensive to implement. According to the invention, there are provided means for maintaining a given distance between the end of the second piston and the push rod at rest, this distance being such that the second piston and the push rod do not enter into contact until just before the closure of the valve.

In order to do this, according to the invention, the push rod is maintained, at rest, in axial abutment against a stationary part of the regulator body, the second piston being returned to rest by means of a simple spring resting on a stationary part of the regulator body.

Preferably, a spring is arranged between the push rod and the first piston.

Thus, when the pressure of the brake fluid in the master cylinder rises, the second piston is at first able to slide freely without having to overcome the thrust exerted by the hydrostatic cushion, only the parasitic effect of the friction of the cups and the force of the return spring of the second piston having to be overcome.

BRIEF DESCRIPTION OF THE DRAWINGS

The invention will be better understood and other objects, advantages and features thereof will become more clearly apparent on reading the following description of an embodiment given by way of a non-limiting example and accompanied by a drawing in which:

the single FIGURE shows diagrammatically in section a brake regulator in accordance with the present invention.

DETAILED DESCRIPTION OF THE INVENTION

With reference now to this single FIGURE, the regulator comprises a body 1. In this body, a person skilled in the art will easily recognise the chamber 3 connected in a conventional manner to a hydrostatic cushion 50 placed close to the vehicle suspension system. A membrane 5 renders this chamber 3 leaktight with respect to the rest of the regulator, and rests on a piston 7 capable of sliding counter to a spring 9.

The valve consists of a second piston 21 and a valve member 23, in this case a ball which is returned by a spring 25. A sealing cup 27 ensures sealing of the chamber 29 which is connected to the master cylinder 52 with respect to the outlet circuit connected to the brake motors of the rear wheels 54 when the valve is closed.

In accordance with the invention, a bush 31 is fixed inside the bore so as to constitute a stop for the push rod 33 cooperating with the first piston 7. In the embodiment shown, the push rod 33 is provided with a head 35 facing the second piston 21. A threaded ring 37 is screwed onto this head 35 so as to form an annular distance piece between the head 35 of the push rod 33 and the bush 31. This ring makes it possible to adjust the height of the distance piece simply by means of screwing. Of course, if there is no need to adjust this height, it is sufficient to use a push rod 33 provided with a head of sufficient size to abut on the bush 31, the thickness of which will be provided for accordingly. A spring 41 is arranged so as to return the second piston 21 to rest, in the open position of the valve. In the example shown, this spring rests on the ring 37. It could, however, also rest on the bush 31.

Finally, in the example illustrated, the push rod 33 is not integral with the piston 7, but cooperates with the latter via a spring 43 which enables the push rod 33 not to be in contact, at rest, with the piston 7 and makes it possible for the chamber 3 to expand as a function of the vehicle load while increasing the force exerted on the push rod 33 in a corresponding manner.

When the pressure of the brake fluid rises in the master cylinder, the second piston 21 is displaced in the direction of the head of the push rod 33 solely counter to the force exerted by the spring 41, the stiffness of which can be favorably chosen as a function of the minimum desired cut-off point of the regulator, that is to say of the pressure at which the valve is to close and of the force produced by the friction of the cups.

The displacement of the second piston 21, which is then not performed counter to the first piston 7, is then easy.

When the pressure increases further, just before reaching the minimum desired cut-off point, the second piston 21 comes into contact with the head 35 of the push rod 33.

By way of example, it may be stated that the height of the distance piece 37 is chosen in such a manner that this contact is obtained between second piston 21 and head 35 while the second piston 21 still has 0.2 mm to travel in order to close the valve. In an exemplary embodiment, the distance, at rest, between the head 35 of the push rod and the end of the second piston 21 was of the order of 3 mm.

At that moment, the force which determines the cut-off point is applied to the second piston 21 via the push rod 33, the spring 43, and the first piston 7.

It will be noted here that the pressure increase of the brake fluid in the chamber 29 has no noticeable direct effect on the position of the first piston 7 and there is therefore no inopportune modification of the cut-off point.

If the pressure increases further, the compensator acts in a conventional manner.

Although only one preferred embodiment has been described, it will be understood that a person skilled in the art will be able to carry out numerous modifications without parting from the scope of the invention. For example, reference has been made above to one possible modification to the head 35 of the push rod 33 making it possible to eliminate the ring 37. But it should also be stated that the push rod 33 could be integral with the piston 7, the spring 43 then being eliminated. In addition, the bush 31 could also be eliminated, the position and the shape of the spring seat 9 then being modified so that the base of this seat acts as a stop for the head 35 of the push rod 33. Finally, a ball valve has been shown, but other types of valve could also be used.

I claim:

1. A brake regulator controlled by the load of a vehicle using fluidic means comprising a fluid cushion which acts on a first piston slideable in a bore formed in the body of said regulator, said first piston being provided with a push rod one end which had a head cooperating with one end of a second piston forming part of a valve which is open in a rest position of the brake regulator and controls a communication of brake fluid between a regulator inlet connected to a master cylinder and a regulator outlet connected to at least one wheel brake, said second piston being initially freely slideable without having to overcome a force transmitted by said fluid cushion, said regulator further comprising means for maintaining, when the brake regulator is at rest and whatever the vehicle load, a predetermined distance between said one end of the second piston and said head of the push rod, the predetermined distance being such that the one end of the second piston and said head of the push rod do not come into contact during braking of the vehicle until just before closure of the valve, the means for maintaining the predetermined distance comprising a stationary part of said body against which the push rod, at said rest of the regulator, axially abuts, and a spring returning to rest said second piston.

2. The regulator according to claim 1, wherein a spring is arranged between said push rod and said first piston.

3. The regulator according to claim 2, wherein said stationary part of said body consists of a bush fixed to said body.

4. The regulator according to claim 1, wherein the means for maintaining the predetermined distance further comprises an annular distance piece screwed onto the head of said push rod in order to come into abutment, at said rest of the brake regulator, against the stationary part of the body.

* * * * *